United States Patent
Takahashi et al.

(10) Patent No.: US 11,042,041 B2
(45) Date of Patent: Jun. 22, 2021

(54) LENS DRIVING APPARATUS, METHOD, AND DEVICE HAVING CORRECTION OF TEMPERATURE INFORMATION ACCORDING TO DRIVE CURRENT

(71) Applicant: Asahi Kasei Microdevices Corporation, Tokyo (JP)

(72) Inventors: Arata Takahashi, Tokyo (JP); Yuki Uchibori, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 398 days.

(21) Appl. No.: 16/010,517

(22) Filed: Jun. 18, 2018

(65) Prior Publication Data

US 2018/0292670 A1 Oct. 11, 2018

Related U.S. Application Data

(63) Continuation of application No. PCT/JP2016/087457, filed on Dec. 15, 2016.

(30) Foreign Application Priority Data

Dec. 15, 2016 (JP) .............................. JP2015-247800

(51) Int. Cl.
*G02B 7/09* (2021.01)
*G02B 27/64* (2006.01)
(Continued)

(52) U.S. Cl.
CPC ............. *G02B 27/646* (2013.01); *G02B 7/02* (2013.01); *G02B 7/028* (2013.01); *G02B 7/04* (2013.01);
(Continued)

(58) Field of Classification Search
CPC .......... G02B 7/008; G02B 7/02; G02B 7/028; G02B 7/04; G02B 7/09; G02B 27/646;
(Continued)

(56) References Cited

U.S. PATENT DOCUMENTS 8,228,623 B2 * 7/2012 Ando .................. H04N 5/23212
359/820
2005/0036775 A1 2/2005 Morimoto
(Continued)

FOREIGN PATENT DOCUMENTS

JP H09222544 A 8/1997
JP 2004287183 A 10/2004
(Continued)

OTHER PUBLICATIONS

International Preliminary Report on Patentability for International Application No. PCT/JP2016/087457, issued by the International Bureau of WIPO dated Jun. 19, 2018.
(Continued)

*Primary Examiner* — Ryan S Dunning

(57) ABSTRACT

An optical module that stably operates an optical camera shake correction, an autofocus function and the like even if a temperature change occurs; a driving apparatus including an actuator that changes a relative position between a lens section and an imaging device, a correction section that corrects a driving amount of the actuator according to temperature information showing an ambient temperature of the lens section, and a control section that controls the driving amount of the actuator; a lens unit, a device, a correction method, and a computer readable recording medium are provided.

20 Claims, 10 Drawing Sheets

(51) Int. Cl.
  *G03B 5/00*    (2021.01)
  *G03B 13/36*   (2021.01)
  *G02B 7/04*    (2021.01)
  *G02B 7/02*    (2021.01)
  *H04N 5/232*   (2006.01)
  *G03B 3/10*    (2021.01)

(52) U.S. Cl.
  CPC .............. *G02B 7/09* (2013.01); *G03B 3/10* (2013.01); *G03B 5/00* (2013.01); *G03B 13/36* (2013.01); *H04N 5/232* (2013.01); *H04N 5/23212* (2013.01); *H04N 5/23287* (2013.01); *G03B 2205/0015* (2013.01); *G03B 2205/0069* (2013.01)

(58) Field of Classification Search
  CPC . G03B 3/10; G03B 5/00; G03B 13/36; G03B 21/53; G03B 2205/0015; G03B 2205/0069; G03F 7/70891; G03F 7/709; H04N 5/232; H04N 5/23212; H04N 5/23287

USPC .......................................... 359/554–557, 820
  See application file for complete search history.

(56)        References Cited

U.S. PATENT DOCUMENTS

2012/0114322 A1   5/2012   Saito
  2015/0130388 A1   5/2015   Fukushima

FOREIGN PATENT DOCUMENTS

JP    2011022563 A    2/2011
  JP    2012013982 A    1/2012
  JP    2014025753 A    2/2014

OTHER PUBLICATIONS

International Search Report for International Patent Application No. PCT/JP2016/087457, issued by the Japan Patent Office dated Mar. 21, 2017.

\* cited by examiner

LENS DRIVING APPARATUS, METHOD, AND DEVICE HAVING CORRECTION OF TEMPERATURE INFORMATION ACCORDING TO DRIVE CURRENT

The contents of the following Japanese patent application (s) are incorporated herein by reference:
NO. 2015-247800 filed in JP on Dec. 18, 2015, and
NO. PCT/JP2016/087457 filed on Dec. 15, 2016.

BACKGROUND

1. Technical Field

The present invention relates to a driving apparatus, a lens unit, a device, a correction method and a computer readable recording medium.

2. Related Art

Conventionally, an optical module having a lens mounted on a digital camera, a mobile phone, a small-magnituded PC and the like has been configured to control a position of the lens by moving, by an actuator and the like, the position of the lens to perform an optical camera shake correction and/or an autofocus function and the like (for example, see Patent Documents 1 and 2).
[Patent Document 1] Japanese Patent Application Publication No. 2011-22563
[Patent Document 2] PCT International Publication No. WO2013/171998

SUMMARY

For stable operation, such an optical module has performed a feedback control by use a detection result of the position of the lens. However, if an ambient temperature changes, the position of the lens varies with thermal expansion and thermal contraction of the lens, a lens holder and the like, and also, an effective focal distance of the lens also changes in some cases. Because such a change causes a focus position of the lens to change, even if the lens is moved to a target position by performing the feedback control, the lens cannot be focused on an object in some cases.

[General Disclosure]
(Item 1) A driving apparatus may include an actuator that changes a relative position between a lens section and an imaging device. The driving apparatus may include a correction section that corrects a driving amount of the actuator according to temperature information showing an ambient temperature of the lens section. The driving apparatus may include a control section that controls the driving amount of the actuator.
(Item 2) A driving apparatus may include an actuator that moves a lens section which moves in at least one direction of an optical axis direction and a direction different from the optical axis direction. The driving apparatus may include a correction section that corrects the driving amount of the actuator according to temperature information showing an ambient temperature of the lens section. The driving apparatus may include a control section that controls the driving amount of the actuator.
(Item 3) The driving apparatus may include a control input section that inputs a control signal that specifies a target position of the lens section. The control section may control the driving amount of the actuator based on the control signal.
(Item 4) The correction section may correct the control signal input from the control input section based on the temperature information.
(Item 5) The driving apparatus may include a magnetic field detection section that detects magnetic field information corresponding to the position of the lens section. The correction section may correct the magnetic field information based on the temperature information. The control section may control the driving amount of the actuator based on the corrected magnetic field information.
(Item 6) The lens section may include a magnetic field generation section that generates a magnetic field. The magnetic field detection section may detect the magnetic field generated by the magnetic field generation section and output the magnetic field information.
(Item 7) The magnetic field detection section may output magnetic field information of a magnitude corresponding to the position of the lens section in one direction.
(Item 8) The driving apparatus may include a focus detection section that detects a focus state of the lens section. The driving apparatus may include an adjustment section that adjusts the driving amount of the actuator based on the focus state of the lens section.
(Item 9) The driving apparatus may include a position detection section that detects the position of the lens section. The driving apparatus may include a device in which the position detection section and the control section are integrally formed.
(Item 10) The driving apparatus may include a temperature detection section that detects the ambient temperature of the lens section and outputs the temperature information. The correction section may correct the driving amount of the actuator based on the temperature information output by the temperature detection section.
(Item 11) The driving apparatus may include a temperature information input section that inputs the temperature information showing the ambient temperature of the lens section.
(Item 12) The correction section may correct the temperature information according to a drive current supplied to the actuator.
(Item 13) The driving apparatus may include a device in which the correction section and the control section are integrally formed.
(Item 14) A lens unit may include a lens section. The lens unit may include the driving apparatus according to any one of Items 1 to 13.
(Item 15) A correction method may include a step of correcting a driving amount of a driving apparatus according to temperature information showing an ambient temperature of a lens section. The correction method may include a step of controlling the driving amount of the driving apparatus.
(Item 16) The correction method may include a step of detecting the ambient temperature of the lens section and outputting the temperature information.
(Item 17) The correction method may include a step of inputting the temperature information that is a detection result of the ambient temperature of the lens section.
(Item 18) The correction method may include a step of inputting a control signal that specifies a target position of the lens section. The step of controlling the driving amount may include a step of controlling the driving amount of the driving apparatus based on the control signal.
(Item 19) The correction method may include a step of detecting the magnetic field information corresponding to a position of the lens section. The step of correcting the driving amount may include a step of correcting the magnetic field information based on the temperature information. The step of controlling the driving amount may include a step of controlling the driving amount of the driving apparatus based on the corrected magnetic field information.

(Item 20) The correction method may include a step of detecting a focus state of the lens section after the step of controlling the driving amount of the driving apparatus. The correction method may include a step of further correcting the driving amount of the driving apparatus based on the focus state of the lens section after the step of controlling the driving amount of the driving apparatus.

(Item 21) A program is for making a computer perform the correction method according to any one of Items 15 to 20.

(Item 22) A device may include an input section that inputs temperature information and a driving amount of an actuator. The device may include a correction value calculation section that calculates a correction value of the driving amount of the actuator to drive a lens section or an imaging device based on the temperature information. The device may include an output section that outputs a corrected driving amount obtained by correcting the driving amount of the actuator based on the driving amount of the actuator and the correction value.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
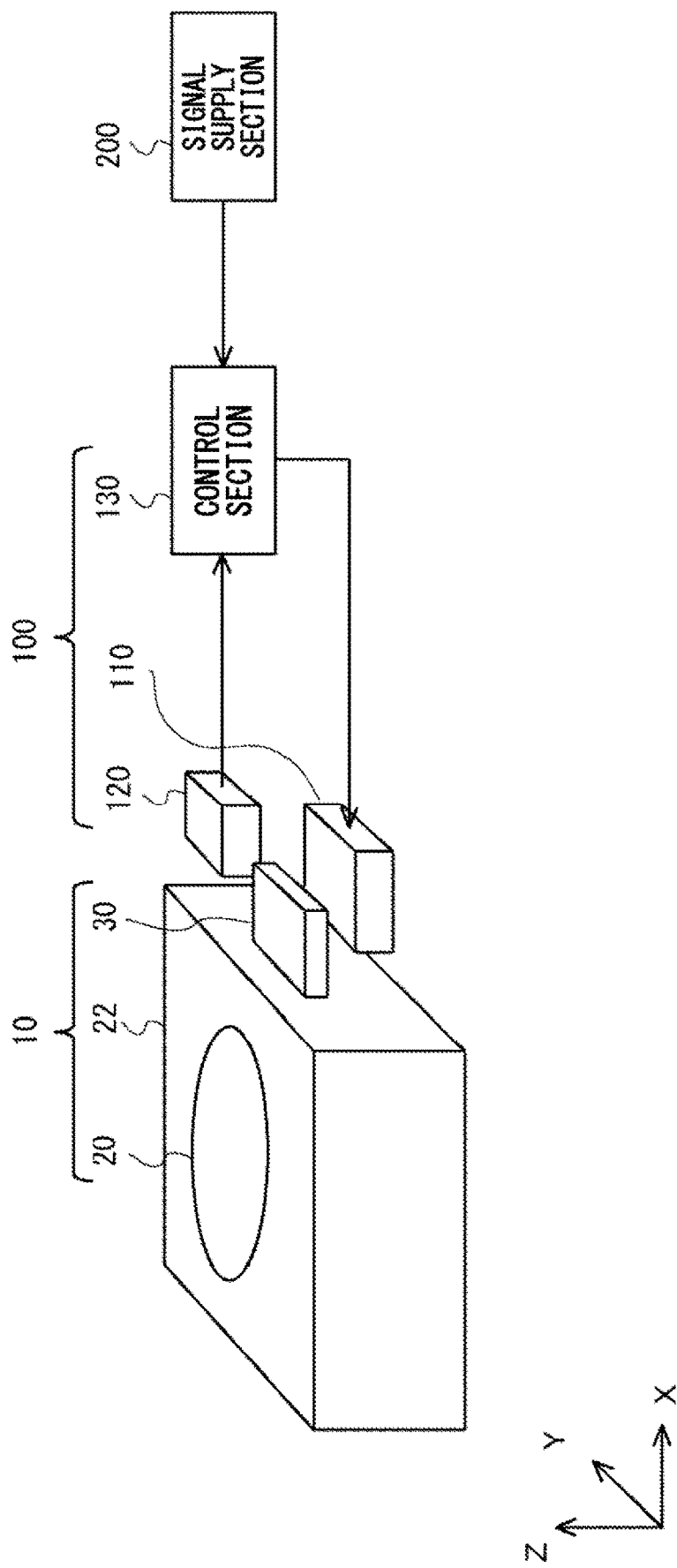
FIG. 1 shows a configuration example of a driving apparatus 100 according to the present embodiment together with a lens section 10 and a signal supply section 200.

FIG. 1 shows a configuration example of the driving apparatus 100 according to the present embodiment together with the lens section 10 and the signal supply section 200.

The driving apparatus 100 supplies, based on a control signal supplied from the signal supply section 200 and a detection result of a position of the lens section 10, a drive signal to the lens section 10 to control the position of the lens section 10.

Here, the lens section 10 is an optical module that is movable in three directions (for example, X, Y, and Z directions) which are orthogonal to one another, as one example. The lens section 10 may be movable in an optical axis direction and/or a direction different from the optical axis direction. The lens section 10 may be movable in at least one direction of the optical axis direction and the direction different from the optical axis direction. Note that the direction different from the optical axis direction may be a direction approximately perpendicular to the optical axis direction of the lens section 10. The lens section 10 according to the present embodiment is driven by the driving apparatus 100 and moves in a predetermined direction. FIG. 1 shows an example in which the lens section 10 moves in a direction approximately identical to an optical axis direction of a lens 20 included in the lens section 10. The lens section 10 includes the lens 20, a lens holder 22, and a magnetic field generation section 30.

The lens 20 refracts lights input from the outside and converges or diverges the lights to an imaging device, an image sensor section or the like. The lens 20 may be a convex lens or a concave lens, and may be formed including glass, plastic or the like. FIG. 1 shows an example in which the lens 20 is arranged approximately parallel to an XY plane and the optical axis is approximately parallel to the Z direction.

The lens holder 22 mounts the lens 20 thereon. By moving the lens holder 22 in the X, Y, or Z direction, for example, the position of the lens 20 is moved. By moving the lens holder 22 in the Z direction, the lens 20 is moved to the direction approximately identical to the optical axis direction and the autofocus operation and the like of the lens section 10 may be performed. Also, by moving the lens holder 22 in the X direction and/or the Y direction, the lens 20 is moved in a direction approximately perpendicular to the optical axis direction and the camera shake correction operation and the like of the lens section 10 may be performed.

The magnetic field generation section 30 generates a magnetic field. The magnetic field generation section 30 may include a permanent magnet. The magnetic field generation section 30 may be fixed to the lens holder 22, and in this case, the magnetic field generation section 30 moves along with the movement of the lens holder 22. That is, at a certain position or a reference point on the outside of the lens section 10, the position of the lens holder 22 can be detected by detecting a magnitude of the magnetic field supplied by the magnetic field generation section 30.

The signal supply section 200 supplies a control signal that specifies a target position of the lens section 10 to the driving apparatus 100. The signal supply section 200 may supply the control signal that is in proportion to a distance from a predetermined reference position to the target position of the lens section 10. The signal supply section 200 may supply the control signal to the driving apparatus 100 according to a target value at which the lens section 10 is to be positioned during a process of performing the autofocus operation, the camera shake correction operation and the like. Also, the signal supply section 200 may supply the control signal corresponding to the target position of the lens section 10 at a reference temperature or a predetermined temperature.

The driving apparatus 100 according to the present embodiment moves the lens section 10 to the target position based on the control signal received from such a signal supply section 200. The driving apparatus 100 includes an actuator 110, a magnetic field detection section 120, and a control section 130.

The actuator 110 moves the lens section 10. The actuator 110 may move the lens section 10 in one direction. The actuator 110 may move the lens section 10 in an optical axis direction of the lens section 10 and/or a direction different from the optical axis direction. The actuator 110 may move the lens section 10 in at least one direction of an optical axis direction of the lens section 10 and the direction different from the optical axis direction. Note that the direction different from the optical axis direction may be a direction approximately perpendicular to the optical axis direction of the lens section 10. The actuator 110 may move the lens section 10 by a magnetic force. The actuator 110 may have an electromagnet that includes one or more coils and that generates a magnetic force by energizing the coil(s). As one example, the actuator 110 faces the magnetic field generation section 30 fixed to the lens section 10, and generates the magnetic force so as to attract or separate the magnetic field generation section 30 to move the lens section 10.

FIG. 1 shows an example in which the actuator 110 generates the magnetic force to move the lens section 10 in a +Z direction or a −Z direction. Instead of this, or in addition to this, the actuator 110 may move the lens section 10 in the direction approximately perpendicular to the optical axis direction of the lens 20. In this case, the lens section 10 may include a plurality of the magnetic field generation sections, and a plurality of the actuators may be provided corresponding to the plurality of magnetic field generation sections. That is, a set of the actuators and the magnetic field generation sections may be provided in each direction in which the lens section 10 is to be moved to respectively move the lens section 10.

For example, for the lens section 10, if two magnetic field generation sections are provided corresponding to the X direction and the Y direction, two actuators are provided facing the two magnetic field generation sections. Each of the actuators can move the lens section 10 on the XY plane by causing corresponding electromagnets to respectively generate the magnetic force. That is, by further providing at least 2 sets of the magnetic field generation sections and the actuators in the lens section 10 and the driving apparatus 100 shown in FIG. 1, the lens section 10 can be moved three-dimensionally.

The magnetic field detection section 120 detects the magnetic field information corresponding to the position of the lens section 10. The magnetic field detection section 120 may detect the magnetic field generated from the lens section 10. As one example, the magnetic field detection section 120 detects the magnetic field generated by the magnetic field generation section 30 fixed to the lens section 10 and outputs the magnetic field information. The magnetic field detection section 120 may output the magnetic field information of a magnitude corresponding to the position of the lens section 10 in one direction. For example, the magnetic field detection section 120 detects the magnetic field of the magnetic field generation section 30 to detect the position of the lens section 10 in the Z direction.

Also, if the actuator 110 moves the lens section 10 three-dimensionally, a plurality of the magnetic field detection sections 120 may be provided and may respectively detect the magnetic fields from the plurality of magnetic field generation sections provided corresponding to the X direction and the Y direction. The magnetic field detection section 120 may include a hall element, a magneto resistive element (MR), a giant magneto resistive element (GMR), a tunnel magneto resistive effect element (TMR), and a magnet impedance element (MI element), and/or an inductance sensor and the like. Note that the magnetic field detection section 120 may output, as the magnetic field information, arithmetic operation results of outputs of these sensors. Also, the magnetic field detection section 120 may be an element in which these sensors and LSI are integrated. The magnetic field detection section 120 supplies the detected magnetic field information to the control section 130.

The control section 130 controls the driving amount of the actuator 110 based on the control signal received from the signal supply section 200 and the magnetic field information received from the magnetic field detection section 120. The control section 130 may control the actuator 110 so that the lens section 10 is positioned at a position corresponding to the control signal. That is, the control section 130 may perform, based on the detection result of the position of the lens section 10, the feedback control according to a closed loop so that the lens section 10 is moved to the position corresponding to the control signal. The control section 130 may provide the closed loop in each actuator 110, that is, in each direction in which the lens section 10 is to be moved to respectively control the actuators.

The control section 130 may control the driving amount of the actuator 110 by using a control parameter. As one example, the control section 130 controls the actuator 110 by using a PID controller (Proportional-Integral-Derivative Controller). In this case, the control section 130 may use, as the control parameter, a proportional gain, an integration gain, a differential gain and the like. The control section 130 may calculate the driving amount of the actuator 110 by a PID control circuit based on a digital signal obtained by A/D converting the magnetic field information of the lens section 10 from the magnetic field detection section 120 and the control signal, and supply, to the actuator 110, a drive signal obtained by D/A converting the calculated driving amount.

As described above, the driving apparatus 100 moves the lens section 10 according to the control signal to control the position of the lens 20. For example, the driving apparatus 100 controls the position of the lens 20 in the optical axis direction (for example, the Z direction) according to the control signal to perform the autofocus function. Also, the driving apparatus 100 controls the position of the lens 20 on the XY plane or a three-dimensional position of the lens 20 according to the control signal to perform the camera shake correction function.

Here, the lens 20 and the lens holder 22 thermally expand and thermally contract according to a change in the ambient temperature. Also, for the lens 20, an effective focal distance may also change according to changes of a refraction index, a shape and the like caused by the change in the ambient temperature. Therefore, as the ambient temperature of the lens section 10 changes, the focus position of the lens 20 may change. That is, even if the position of the lens section 10 is accurately moved to the target position by the feedback control, when the ambient temperature of the lens section 10 changes, a focus deviation for an object may occur.

Here, the driving apparatus 100 according to the present embodiment detects the ambient temperature of the lens section 10 and corrects the driving amount of the actuator 110 that moves the lens section 10 to reduce the focus deviation caused by the temperature change. For such a driving apparatus 100, details are described by using FIG. 2.

Figure 2:
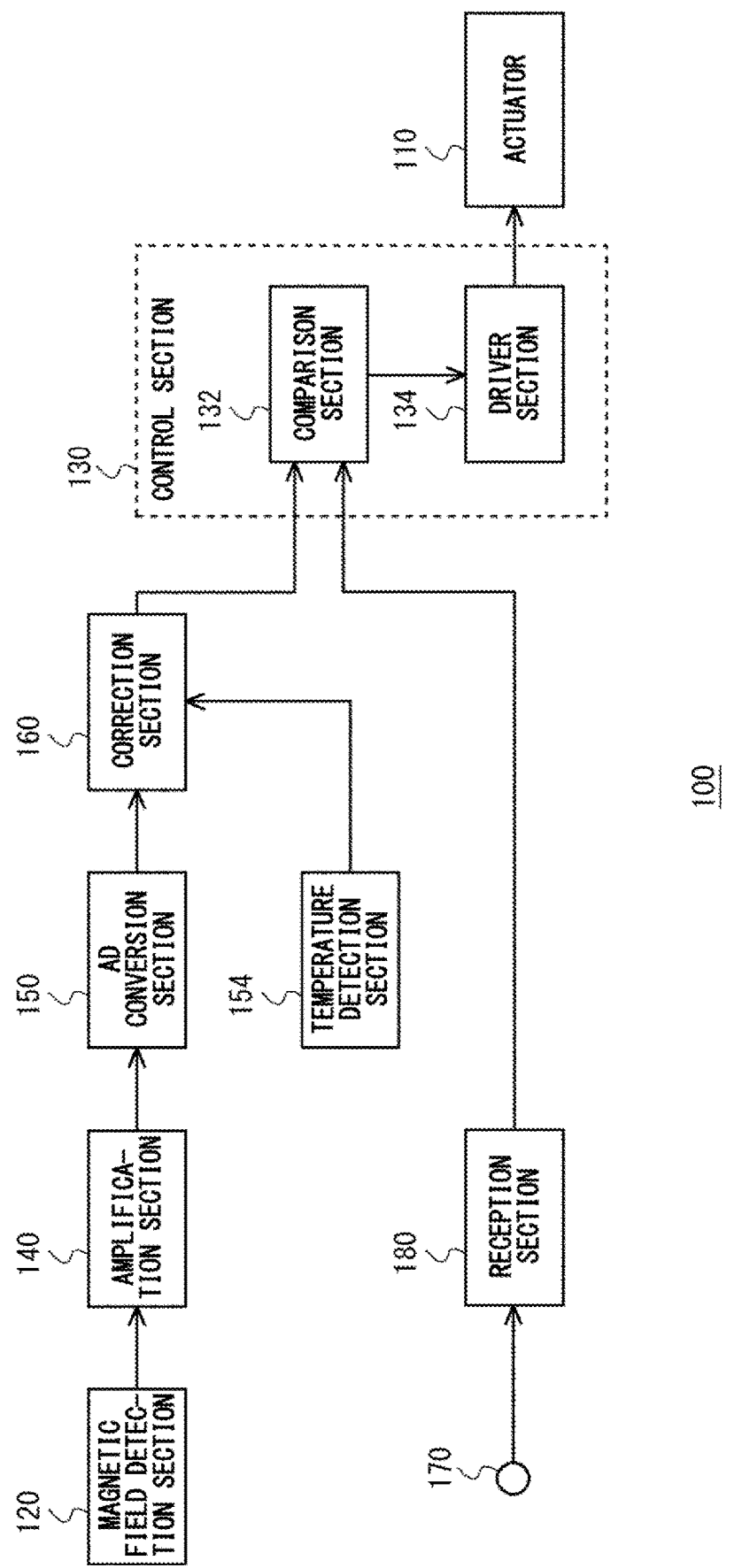
FIG. 2 shows a first configuration example of the driving apparatus 100 according to the present embodiment.

FIG. 2 shows a first configuration example of the driving apparatus 100 according to the present embodiment. In the driving apparatus 100 of the first configuration example, operations approximately identical to the operations of the driving apparatus 100 according to the present embodiment shown in FIG. 1 are provided with the same signs as those of the operations of the driving apparatus 100 according to the present embodiment shown in FIG. 1, and the description is omitted. The driving apparatus 100 of the first configuration example further includes an amplification section 140, an AD conversion section 150, a temperature detection section 154, a correction section 160, an input section 170, and a reception section 180.

The amplification section 140 amplifies a detection signal corresponding to the magnetic field information detected by the magnetic field detection section 120. The amplification section 140 may amplify an amplitude voltage or current value of the detection signal to one time or more. The amplification section 140 supplies the amplified signal to the AD conversion section 150. The AD conversion section 150 converts the amplified signal received from the amplification section 140 into a digital signal. The AD conversion section 150 supplies the converted digital signal to the correction section 160.

The temperature detection section 154 detects the ambient temperature of the lens section 10 and outputs the temperature information. The temperature detection section 154 may also detect, as the ambient temperature of the lens section 10, any temperature of the following temperatures: a temperature of the lens section 10, a temperature of a space in the vicinity of the lens section 10, a temperature of a module member in the vicinity of the lens section 10, or a temperature of an imaging device or an image sensor. Also, the temperature detection section 154 may also detect an average temperature of the plurality of temperatures described above and output the average temperature as the temperature information. The temperature detection section 154 may be a digital-type or an analog-type semiconductor sensor. Instead of this, the temperature detection section 154 may also be a thermistor, a temperature measurement resistor, a thermocouple or the like. Also, the temperature detection section 154 may also be a coil used in a voice coil motor. The temperature detection section 154 supplies the temperature information to the correction section 160.

The correction section 160 corrects the digital signal received from the AD conversion section 150 and supplies the corrected signal to the control section 130. The correction section 160 corrects the driving amount of the actuator 110 according to the temperature information showing the ambient temperature of the lens section 10. The correction section corrects the driving amount of the actuator 110 based on the temperature information output by the temperature detection section 154. The correction section 160 corrects the magnetic field information detected by the magnetic field detection section 120 based on the temperature information. The correction section 160 corrects the magnetic field information and outputs the corrected magnetic field information to the control section 130.

The input section 170 inputs the control signal that specifies the target position of the lens section 10. The input section 170 inputs the control signal supplied from the signal supply section 200 on the outside of the driving apparatus 100. The input section 170 may input an electrical signal, a radio wave signal or the like. Note that the input section 170 may have an antenna and the like for inputting the radio wave signal. The input section 170 supplies the control signal to the control section 130 via the reception section 180.

The reception section 180 receives the control signal. If the control signal is sent in a specified communication manner, the reception section 180 may receive the control signal according to the communication manner. The reception section 180 receives the sent control signal in a serial communication manner, a parallel communication manner, a network, a radio communication manner, or the like, for example. As one example, the reception section 180 receives the sent control signal in an I2C (Inter-Integrated Circuit) manner. The reception section 180 supplies the received control signal to the control section 130.

The control section 130 controls the driving amount of the actuator 110. That is, the control section 130 controls the driving amount of the actuator 110 based on the magnetic field information corrected by the correction section 160. Also, the control section 130 controls the driving amount of the actuator 110 so that the lens section 10 is moved to the position corresponding to the control signal supplied from the reception section 180. The control section 130 includes a comparison section 132 and a driver section 134.

The comparison section 132 compares the corrected magnetic field information to the control signal and outputs the comparison result. The comparison section 132 may also multiply the comparison result by a constant and then output the comparison result. The comparison section 132 may include a differential amplification circuit. The comparison section 132 may include the PID controller. The comparison section 132 supplies the comparison result to the driver section 134.

The driver section 134 outputs the drive signal of the actuator 110 based on the comparison result of the corrected magnetic field information and the control signal. For example, if the comparison result is almost zero, the driver section 134 maintains the drive signal being output. That is, if the control signal corresponding to the target position of the lens section 10 approximately matches the magnetic field information corresponding to the detection position of the lens section 10, the driver section 134 may determine that the lens section 10 has been positioned at the target position and maintain the drive signal of the actuator 110.

Also, if the comparison result is different from almost zero, the driver section 134 changes the drive signal being output. If the comparison result is larger than zero, the driver section 134 may change the drive signal to a greater one. The driver section 134 changes the drive signal so that an absolute value of the comparison result is close to zero.

As described above, the control section 130 according to the present embodiment operates so that the magnetic field information corresponding to the detection position of the lens section 10 approximately matches the magnetic field information corresponding to the target position of the lens section 10. Here, the correction section 160 corrects the magnetic field information so as to reduce the focus deviation accompanying the temperature change. The operation of such a driving apparatus 100 is described next.

Figure 3:
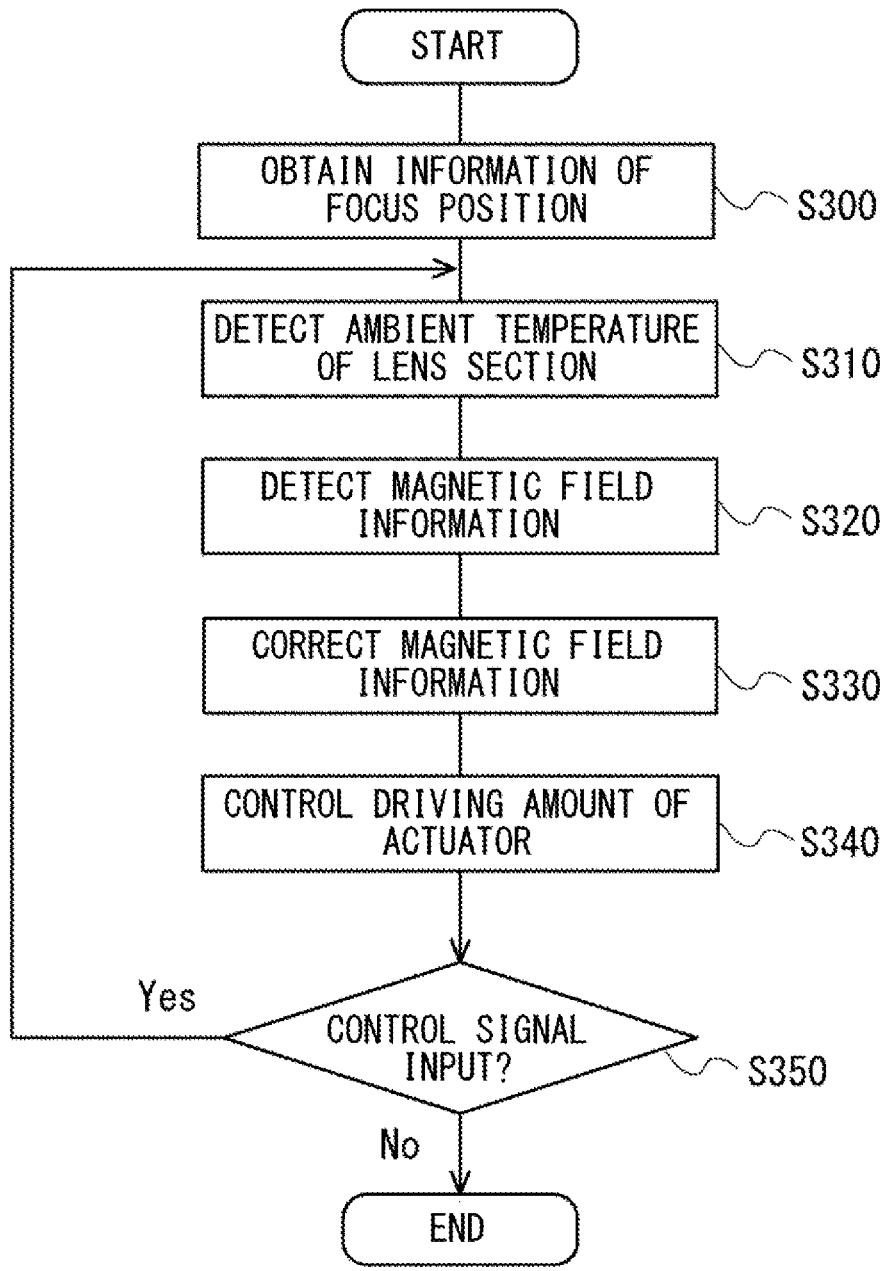
FIG. 3 shows one example of an operation flow of the driving apparatus 100 according to the present embodiment.

FIG. 3 shows one example of an operation flow of the driving apparatus 100 according to the present embodiment. By performing the operation flow shown in FIG. 3, the driving apparatus 100 moves the lens section 10 to the position corresponding to the control signal supplied from the outside to reduce the focus deviation even if the ambient temperature of the lens section 10 changes.

First, the driving apparatus 100 obtains information about a change of the focus position of the lens 20 relative to a temperature change ΔT (S300). For example, the driving apparatus 100 obtains, by a manufacturer, information of a function F(ΔT) and stores the information in a storage section and the like accessible from the correction section 160 and the like. Also, the driving apparatus 100 may also measure a change of the lens section 10 relative to the temperature change and store the change in a table and the like. The information related to the change of the focus position of the lens 20 may be stored during a step of manufacturing the driving apparatus 100. Also, the information may also be obtained, stored and updated via a network and the like.

Next, the temperature detection section 154 detects the ambient temperature of the lens section 10 (S310). The temperature detection section 154 supplies the detected temperature information of the lens section 10 to the correction section 160. Note that if the detected ambient temperature falls out of a range of an operation temperature of the driving apparatus 100, the temperature detection section 154 may notify a temperature abnormality and stop or cancel the operation of the driving apparatus 100.

Next, the magnetic field detection section 120 detects the magnetic field information corresponding to the position of the lens section 10 (S320). Then, the correction section 160 corrects the magnetic field information corresponding to the position of the lens section 10 based on the temperature information received from the temperature detection section 154 (S330). For example, the correction section 160 corrects a change of the effective focal distance of the lens 20 relative to the temperature change by using a function obtained from the outside and the like. Because the change of the effective focal distance of the lens 20 occurs due to the changes of the refraction index, the shape and the like accompanying the temperature change, such information of the change of the effective focal distance relative to the temperature can be obtained from the manufacturer and the like of the lens 20. Also, such a function may also be obtained by actually measuring. Also, other than the effective focal distance of the lens, the distance between the image sensor and the lens section 10 may also change by an influence of the thermal expansion and contraction of a member such as a housing; however, with respect to this, the influence can also be estimated by a simulation and the like.

As one example, a position to which the lens 20 is to be moved by the driving apparatus 100 relative to a distance d (an object distance) from the lens 20 to an object is set to x (a position code). Then, a change amount that the position x changes due to the temperature change ΔT which changes from a reference temperature or a predetermined temperature is set to a function F(ΔT). Here, the reference temperature or the predetermined temperature is set to $T_0$. The correction section 160 can calculate, by using the function F(ΔT), the position code x+F(ΔT) which is temperature-corrected relative to the object distance d.

That is, to correct the focus deviation of the lens 20, the correction section 160 may correct the magnetic field information so that the lens section 10 is moved by F(ΔT). For example, the correction section 160 subtracts F(ΔT) from the magnetic field information and takes a detection position that is shifted by −F(ΔT) from a detection position of the lens section 10 that is actually detected, as the magnetic field information after the correction.

Next, the control section 130 controls the driving amount of the actuator 110 based on the corrected magnetic field information and the control signal (S340). For example, the control section 130 moves the lens section 10 according to the control signal supplied to the input section 170 from the signal supply section 200 on the outside of the driving apparatus 100. Note that the signal supply section 200 is set to supply the control signal that specifies the position x of the lens section 10 at the reference temperature $T_0$, and for example, if the temperature has changed by ΔT from $T_0$, the focus position changes to x+F(ΔT).

Therefore, if the control section 130 compares the magnetic field information before the correction to the control signal, controls the drive signal and moves the position of the lens section 10 to the position x specified by the control signal, the focus deviation of F(ΔT) occurs. With respect to this, because the correction section 160 according to the present embodiment subtracts the magnetic field information after the correction by F(ΔT), for example, if the control section 130 compares the magnetic field information after the correction to the control signal and controls the drive signal so that the comparison result is close to zero, the position of the lens section 10 is moved to the position that is shifted by +F(ΔT) from the position x specified by the control signal, and the focus deviation can be reduced.

The driving apparatus 100 may repeat, by the closed loop, the movement, the position detection, and the correction of the lens section 10 to stabilize the position of the lens section 10. In this case, for example, the driving apparatus 100 repeats the operations from S320 to S340 until the comparison result of the corrected magnetic field information and the control signal is equal to or less than a reference value or a threshold value.

If a next control signal from the signal supply section 200 is supplied to the input section 170 (S350: Yes), the control section 130 returns to S310 and moves the lens section 10 to the target position corresponding to the next control signal. Here, the correction section 160 may correct, according to the temperature detection result of the temperature detection section 154 being the temperature change within the reference temperature range compared to a previous temperature detection result, the magnetic field information by using the correction value approximately identical to the correction value used previously. Instead of this, the correction section 160 may also correct the magnetic field information after determining the correction value per temperature detection.

Also, in a case where the temperature is detected only in the initial period, a case where the temperature is detected for each predetermined certain time, a case where the temperature is detected per predetermined loop frequency, a case where the temperature is detected in a state in which the lens section is not moved, or the like, the operation may not be returned to S310 or may also be returned to S320. If the control signal is not supplied to the input section 170 from the signal supply section 200 (S350: No), the control section 130 may end the movement of the lens section 10.

As described above, because the driving apparatus 100 according to the present embodiment corrects the detection result of the position of the lens section 10 so as to reduce the influence of the change of the ambient temperature even if the ambient temperature changes, the lens section 10 can be moved to an accurate focus position corresponding to the target position. Accordingly, even if the temperature change occurs, the driving apparatus 100 can reduce the focus deviation for the object to stably operate the optical camera shake correction, the autofocus function and the like.

The example in which the correction section 160 according to the present embodiment described above calculates the correction value by using the function F has been described. Instead of this, or in addition to this, the correction section 160 may also measure in advance the change of the position of the lens section 10 or the change of the lens holder 22 relative to the change of the ambient temperature, and use the correction value corresponding to the measurement result to correct the magnetic field information. In this case, the correction section 160 may have a storage section that stores a table of the correction values for a plurality of the object distances d, and use the table to correct the magnetic field information.

Figure 4:
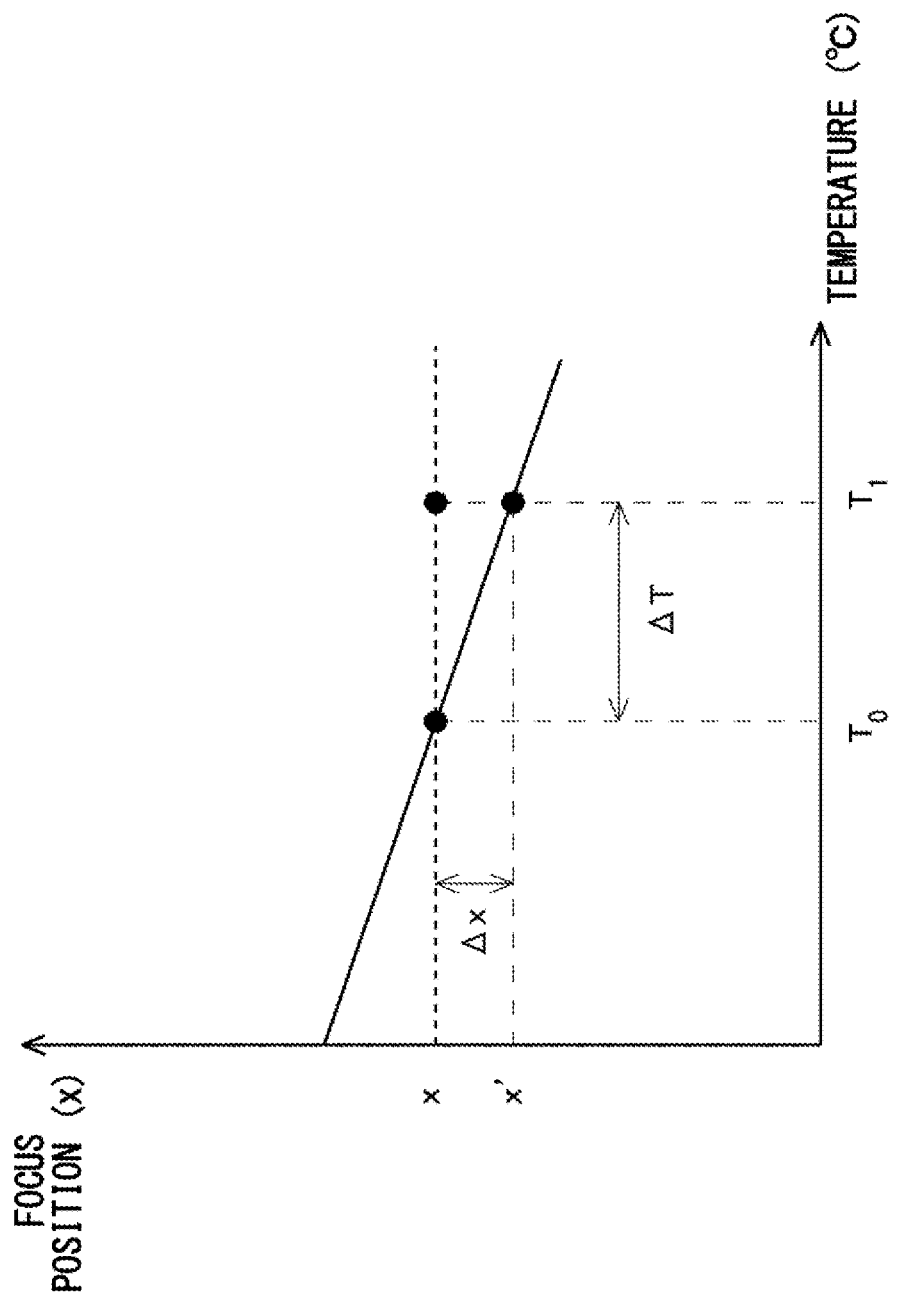
FIG. 4 shows one example of a relation of a focus position to an ambient temperature of the lens section 10 according to the present embodiment.

FIG. 4 shows one example of the relation of the focus position relative to the ambient temperature of the lens section 10 according to the present embodiment. In FIG. 4, the horizontal axis indicates relative ambient temperatures of the lens section 10 and the vertical axis indicates examples of the focus position of the lens section 10. The focus position of the lens section 10 changes according to the change of the temperature as shown by the solid line of FIG. 4. Such a change varies with a material quality of a machine structure of the lens holder 22 and the like, a material quality and the like of the lens 20; however, as one example, the focus position may change by a few percent of the movement range of the lens section 10 relative to the temperature change by a few degrees Celsius.

Therefore, for example, if an imaging apparatus in a room at a reference temperature $T_0$ (as one example, 25 degrees Celsius) is carried out to the outside of the room at a temperature $T_1$ (as one example, 35 degrees Celsius) for imaging, because the focus position changes by $\Delta x$ (for example, by about 10 percent of the movement range) due to the change of the environment temperature by $\Delta T$ (in the present example, 10 degrees Celsius), the autofocus function and the like do not normally operate. Here, the correction section 160 according to the present embodiment detects the temperature change $\Delta T$ and calculates the change $\Delta x$ of the focus position corresponding the temperature change to perform the correction. As described above, the correction section 160 may correct the change of the focus position by using the function F and/or the table.

Such a driving apparatus 100 may be formed as a device in which at least parts are integrated. That is, the driving apparatus 100 may include a device in which the magnetic field detection section 120 and the control section 130 are integrally formed. Also, the driving apparatus 100 may include a device in which the magnetic field detection section 120, the control section 130, and the temperature detection section 154 are integrally formed. Instead of this, the driving apparatus 100 may be a device integrally formed. Such a device may be formed into a chip as an integrated circuit. That is, the device may be formed as one chip driver IC of the actuator 110 incorporating the magnetic field detection section 120 therein.

If the driving apparatus 100 is formed into one chip including the temperature detection section 154, the temperature detection section 154 can be easily arranged at the position in the vicinity of the lens section 10 and the temperature detection section 154 can measure the ambient temperature more accurately. Note that if the temperature detection section 154 is formed into one chip together with the control section 130, the temperature of the chip may rise according to a drive current being supplied to the actuator 110 by the driver section 134, and in this case, the temperature detection section 154 detects the temperature change including the temperature rise.

Here, the correction section 160 may also correct the temperature information according to the drive current supplied to the actuator 110. For example, if the actuator 110 has a coil and the driver section 134 supplies a drive current $I_{coil}$ to the coil, a heat being in proportion to an electrical power $I_{coil} \cdot V_{dd}$ is generated. Here, $V_{dd}$ is a power source voltage of the control section 130. Also, if a current $I_{ic}$ other than the drive current is consumed within the chip, a heat being proportion to $(I_{coil}+I_{ic}) \cdot V_{dd}$ is generated in the chip.

That is, in the chip, a temperature change of a temperature $T_d=(I_{coil}+I_{ic}) \cdot V_{dd}/\theta$ occurs. Here, $\theta$ is a thermal resistance of a semiconductor and the like forming the chip. In this case, the correction section 160 may subtract the temperature $T_d$ from a detection temperature $T_{det}$ of the temperature detection section 154 to perform the correction. That is, the correction section 160 may calculate the temperature $T=T_{det}-T_d$ as the ambient temperature of the lens section 10. In this case, the correction section 160 may calculate the temperature change $\Delta T$ as $\Delta T=(T_{det}-T_d)-T_0$. Note that if the current flowing within the chip is almost zero or is as small as it can be ignored compared to the drive current, the correction section 160 may also calculate the temperature $T_d=I_{coil} \cdot V_{dd}/\theta$.

Also, for such a temperature, the environment temperature and the like may also be calculated by using a predetermined coefficient and the like. For example, the environment temperature is calculated by multiplying the above-described temperature T or $\Delta T$ by a constant correlated to an environment temperature on the outside. Also, the environment temperature may also be estimated by imparting a proper time constant for a more detailed estimation as a function with at least one of the time, the current and the voltage as a variable. Specifically, an environment temperature $T_a$ may be set as $T_a=T_0+\{1-\exp(-t/\tau)\} \cdot R \cdot W$ in a simple heat transmission model. (R: proportional coefficient, W: electrical power, t: elapsed time, $\tau$: time constant)

Instead of this, a model such as a superposition of a plurality of functions may also be used. Note that these temperature corrections may also be corrections of the influence of the thermal expansion and/or contraction of a member such as the housing.

Also, the above-described calculation has described the example of the calculation assuming a case in which the current flows in the driver section 134; however, instead of this, the temperature when starting up the driving apparatus 100 and the temperature when the current flows in the driver section 134 may also be detected. That is, the temperature change $T_d$ may also be calculated by subtracting a temperature in a state in which a driver current does not flow from the temperature when the current flows in the driver section 134.

As described above, the example in which the correction section 160 in the driving apparatus 100 according to the present embodiment corrects the digital signal output by the AD conversion section 150 so as to reduce the influence of the change of the ambient temperature has been described. Instead of this, the correction section 160 may also correct the magnetic field information during a process of converting the input signal into the digital signal by the AD conversion section 150. In this case, the correction section 160 may correct a conversion parameter used by the AD conversion section 150 for converting the signal into the digital signal, a correction parameter, and/or an offset parameter and the like.

Instead of this, the driving apparatus 100 may also correct an analog signal input to the AD conversion section 150. In this case, the correction section 160 that corrects the analog signal may be provided on the input side and/or the output side of the amplification section 140. Also, the input/output response of the amplification section 140 may also be corrected. Also, the driving apparatus 100 may also combine these corrections.

Figure 5:
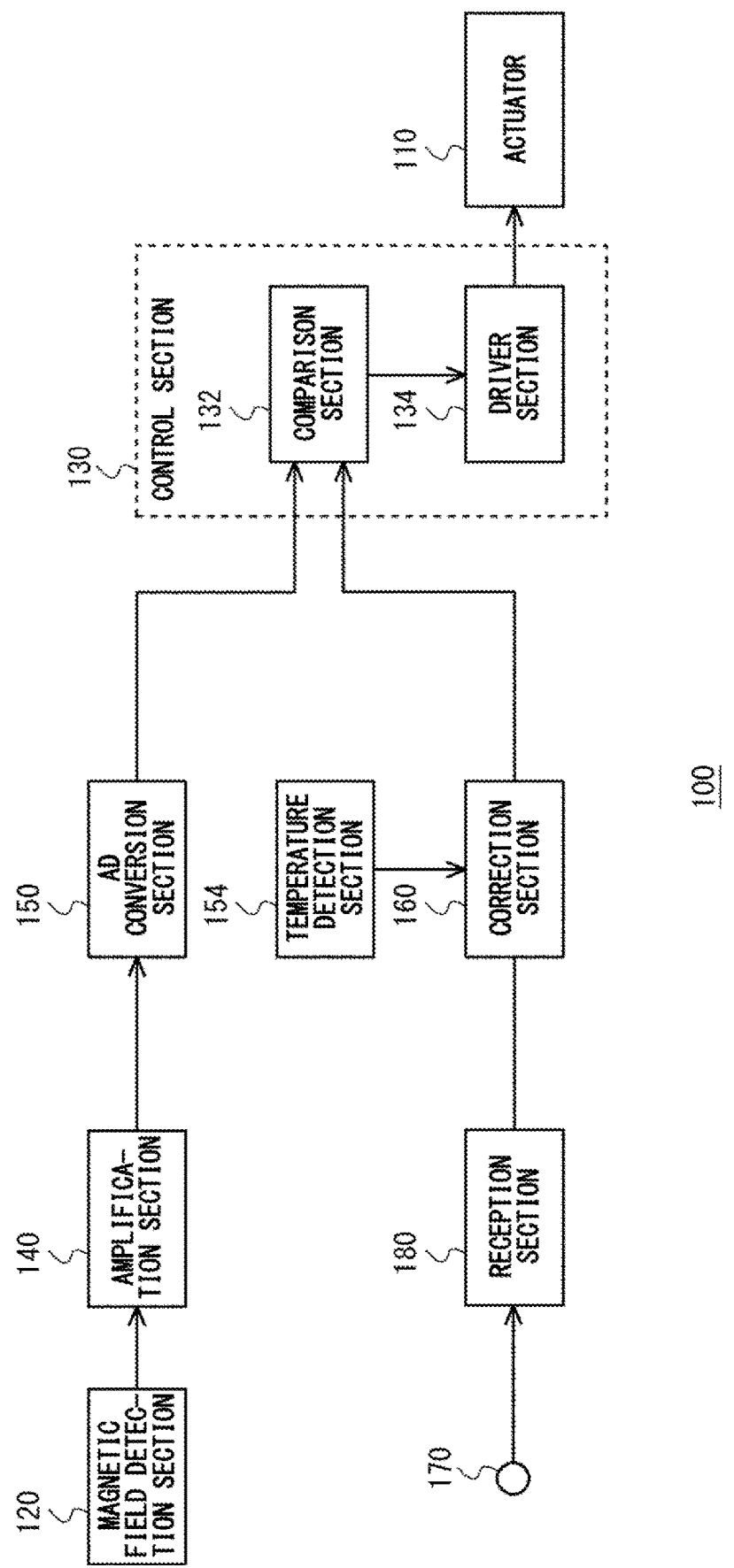
FIG. 5 shows a second configuration example of the driving apparatus 100 according to the present embodiment.

Instead of this, the driving apparatus 100 may also correct the control signal. For such a driving apparatus 100, details are described by using FIG. 5. FIG. 5 shows a second configuration example of the driving apparatus 100 according to the present embodiment. In the driving apparatus 100 of the second configuration example, operations approximately identical to the operations of the driving apparatus 100 according to the present embodiment shown in FIG. 2 are provided with the same signs as those of the driving apparatus 100 according to the present embodiment shown in FIG. 2. The description is omitted. The driving apparatus 100 of the second configuration example corrects the control signal supplied from the signal supply section 200 on the outside.

That is, the correction section 160 of the second configuration example communicates with the input section 170, receives the control signal input from the input section 170, corrects the control signal based on the temperature information, and supplies the corrected control signal to the control section 130. The correction section 160 corrects the control signal input from the input section 170 and outputs the corrected control signal. For example, the correction section 160 corrects the control signal supplied by assuming a response of the magnetic field detection section 120 without considering the temperature change as shown by the dotted line of FIG. 4 so that the response becomes the response as shown by the solid line of FIG. 4.

For example, the signal supply section 200 supplies, to the driving apparatus 100, the magnetic field information y corresponding to the target position x as the control signal to move the lens section 10 to the target position x. Here, the magnetic field information y is the magnetic field information detected by the magnetic field detection section 120 according to the lens section 10 being positioned at the target position x in a case where the temperature does not change. In this case, the correction section 160 corrects the control signal y to y'. Here, the magnetic field information y' is, as one example, the magnetic field information detected by the magnetic field detection section 120 according to the lens section 10 being positioned at the target position x+Δx in a case where the temperature does not change. That is, the magnetic field information y' is also the magnetic field information detected by the magnetic field detection section 120 according to the lens section 10 being positioned at the position x' in a case where the temperature change of ΔT occurs.

Accordingly, if the lens section 10 is positioned at the position x+Δx, the magnetic field information detected by the magnetic field detection section 120 can be set to a value approximately identical to that of the control signal y' corrected by the correction section 160. Therefore, the control section 130 can cause the lens section 10 to be moved to a more accurate focus position x+Δx corresponding to the target position x by controlling the driving amount of the actuator 110 based on the corrected control signal and the magnetic field information.

In this way, the correction section 160 corrects the control signal corresponding to the target position of the lens section 10 in a case where the temperature $T_0$ is assumed so that the control signal becomes the control signal corresponding to the target position of the lens section 10 at the temperature $T_0+\Delta T$. Accordingly, the control signal corresponding to the position x+Δx becomes approximately identical to the magnetic field information, and the driver section 134 can supply the drive signal so as to maintain the lens section 10 at the more accurate focus position x+Δx corresponding to the target position x. Note that the correction section 160 may also calculate F(ΔT) as Δx by using the function F(ΔT).

Instead of this, or in addition to this, the correction section 160 may also calculate Δx by using a table obtained in advance and the like.

Figure 6:
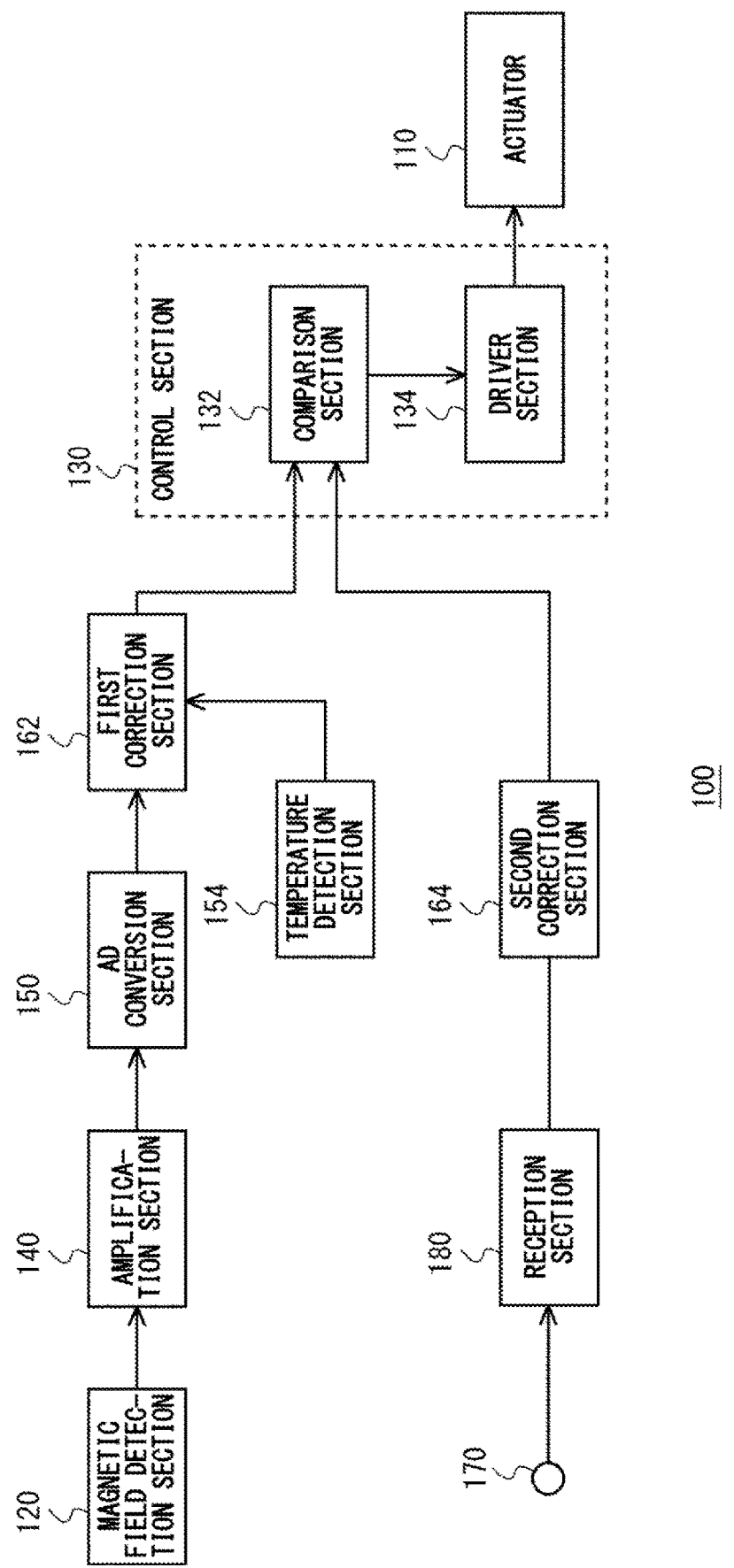
FIG. 6 shows a third configuration example of the driving apparatus 100 according to the present embodiment.

It has been described that the driving apparatus 100 according to the present embodiment described above corrects the magnetic field information or the control signal. Instead of this, the driving apparatus 100 may also correct the magnetic field information and the control signal. For such a driving apparatus 100, details are described by using FIG. 6. FIG. 6 shows a third configuration example of the driving apparatus 100 according to the present embodiment. In the driving apparatus 100 of the third configuration example, operations approximately identical to the operations of the driving apparatus 100 according to the present embodiment shown in FIG. 2 and FIG. 5 are provided with the same signs as those of the operations of the driving apparatus 100 according to the present embodiment shown in FIG. 2 and FIG. 5. The description is omitted.

The driving apparatus 100 of the third configuration example may include a plurality of the correction sections. FIG. 6 shows an example in which the correction section 160 includes a first correction section 162 and a second correction section 164, where the first correction section 162 corrects the magnetic field information and the second correction section 164 corrects the control signal.

The first correction section 162 may correct the magnetic field information, as described in FIG. 2. In this case, the second correction section 164 may further correct the control signal input from the input section 170. The second correction section 164 corrects an output level of the magnetic field information, as one example. FIG. 6 shows an example of the driving apparatus 100 in this case.

Instead of this, the second correction section 164 may correct the control signal input from the input section 170, as described in FIG. 5. In this case, the second correction section 164 may receive the temperature information from the temperature detection section 154. Also, the first correction section 162 may further correct the magnetic field information. That is, the first correction section 162 corrects an output level of the magnetic field information, as one example.

Instead of this, the first correction section 162 and the second correction section 164 may also respectively correct the magnetic field information and the control signal. For example, the first correction section 162 corrects the magnetic field information by using a first correction value when the position of the lens section 10 is within a range of a first area, and the second correction section 164 corrects the control signal by using a second correction value, that is different from the first correction value, when the position of the lens section 10 is within a range of a second area. Also, at least one of the first correction section 162 and the second correction section 164 may also further correct the output level. The driving apparatus 100 can perform various corrections by having the plurality of correction sections. Here, the division into the first area and the second area may also be determined based on the magnetic field information or a magnitude of the input control signal.

Figure 7:
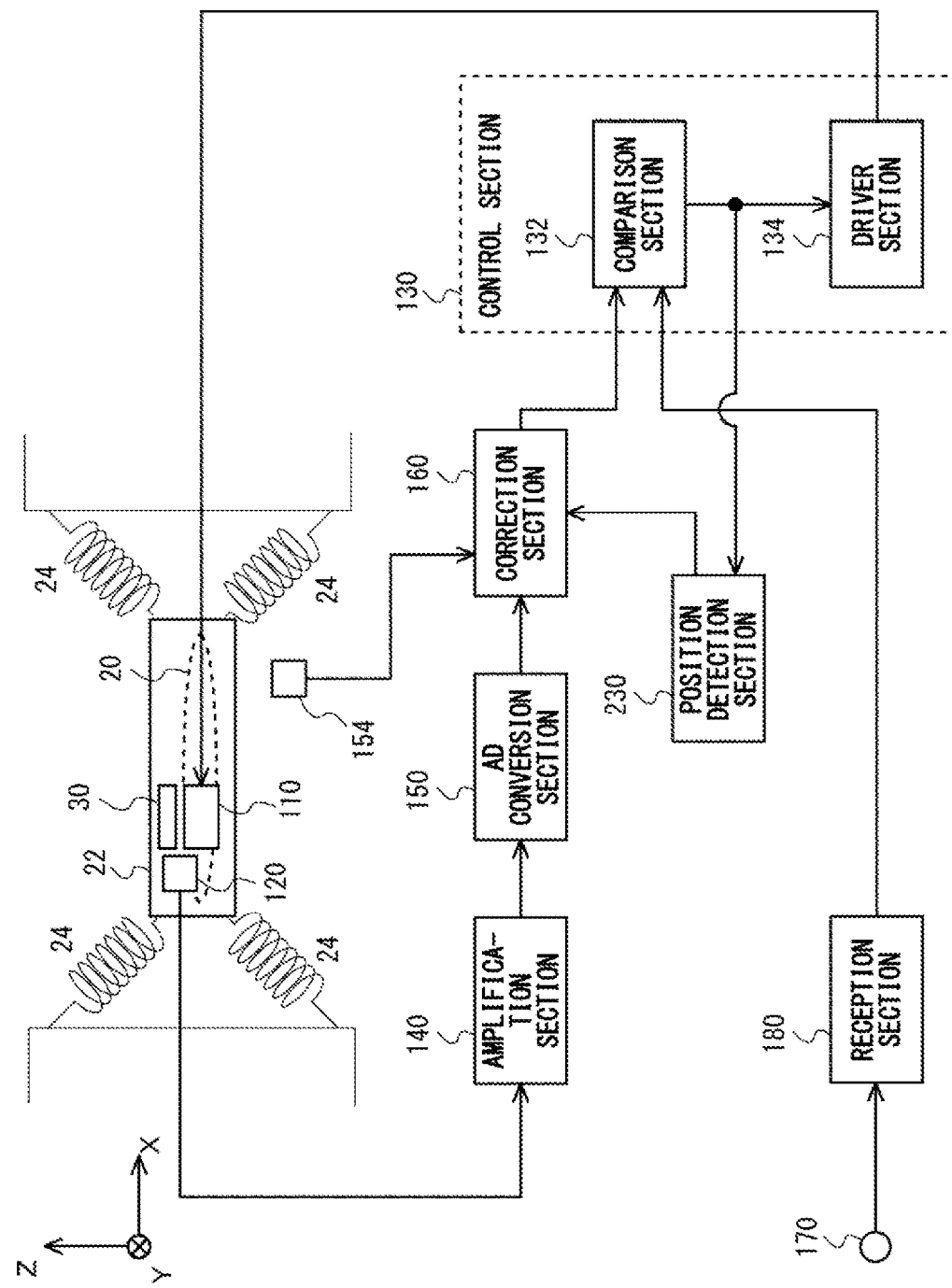
FIG. 7 shows a fourth configuration example of the driving apparatus 100 according to the present embodiment.

FIG. 7 shows a fourth configuration example of the driving apparatus 100 according to the present embodiment. The driving apparatus 100 of the fourth configuration example drives a spring-type lens section 10. The lens section 10 further includes an elastic body 24, and one end of the elastic body 24 is connected to the lens holder 22 and the other end of the elastic body 24 is fixed, as one example. In this case, the actuator 110 moves the position of the lens section 10 to a position corresponding to a driving force corresponding to the driving amount of the control section 130 and an elastic force of the elastic body 24. That is, the lens holder 22 is moved to the position at which the elastic force of the elastic body 24 and the driving force of the actuator 110 are balanced with each other.

In such a spring-type lens section 10 as well, the driving apparatus 100 corrects the detection result of the magnetic field detection section 120 based on the temperature information detected by the temperature detection section 154. Instead of this, or in addition to this, the driving apparatus 100 may also correct the control signal based on the temperature information.

Note that because the spring-type lens section 10 is moved to the position corresponding to the driving force of the actuator 110, the position of the lens section 10 can be detected according to the drive signal supplied to the actuator 110. Therefore, the driving apparatus 100 may also further include a position detection section 230 that detects the position of the lens section 10.

That is, the position detection section 230 detects the position of the lens section 10 according to the input signal of the driver section 134. Note that the position detection section 230 may also receive the drive signal of the actuator 110, which is an output of the driver section 134, and detect the position of the lens section 10.

Because the position detection section 230 can detect the position of the lens section 10, the correction value can be generated so that the position of the lens section 10 matches the corrected magnetic field information. That is, the correction section 160 may receive the position of the lens section 10 output by the position detection section 230 to ascertain whether a difference from the corrected magnetic field information is within a reference range or not. The correction section 160 may change the correction value so as to correspond to the position of the lens section 10 if the difference is not within the reference range.

In this way, the driving apparatus 100 of the fourth configuration example can obtain the correction result according to the correction section 160 as the position information of the position detection section 230. Therefore, the correction section 160 can perform a fine adjustment on the correction of the magnetic field information based on the position information of the position detection section 230. Accordingly, the driving apparatus 100 can calibrate the correction value without using a position detection apparatus that detects the position of the lens section 10 by using laser light and the like. That is, the driving apparatus 100 can drive the actuator 110 while calibrating the correction value. Note that the example in which the correction section 160 in the driving apparatus 100 shown in FIG. 7 corrects the magnetic field information has been described; however, instead of this, the correction section 160 may also correct the control signal.

The driving apparatus 100 according to the present embodiment described above moves the lens section 10 to the position corresponding to the control signal to stably perform the autofocus function and camera shake correction function. As one example, such an autofocus function measures a distance between an object and the lens section 10 by using infrared light, an ultrasonic wave or the like to determine the position of the lens section 10 according to the measurement result. Therefore, due to a measurement error of the distance, a movement of the object, a determination algorithm of the position of the lens section 10 and the like, the focus position of the lens 20 may not match the intended position of the object even if the driving apparatus 100 moves the lens section 10 to the position corresponding to the control signal.

Figure 8:
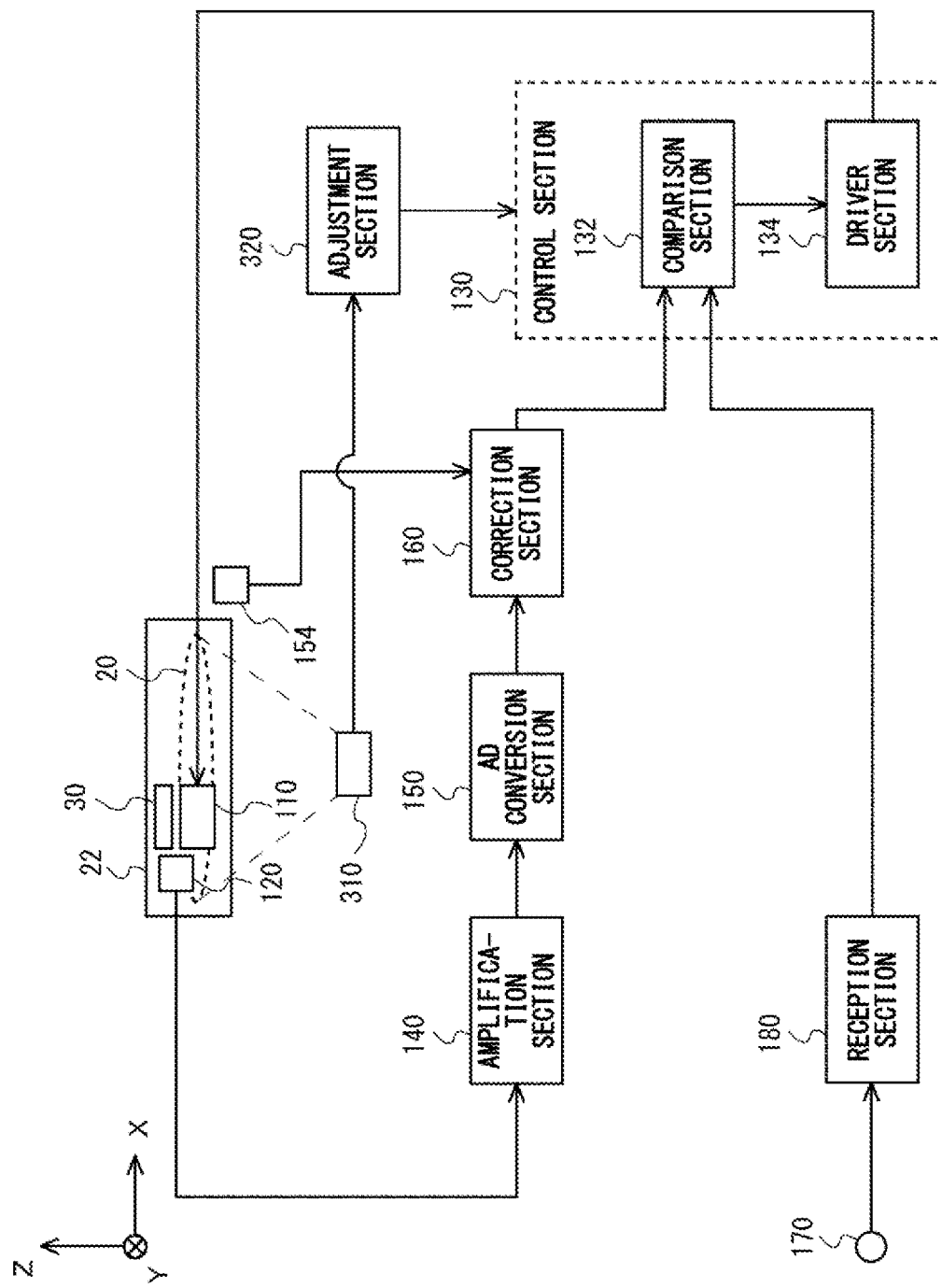
FIG. 8 shows a fifth configuration example of the driving apparatus 100 according to the present embodiment.

Here, the driving apparatus 100 may also further perform a fine adjustment on the focus position of the lens 20 after the lens section 10 is moved to the position specified by the control signal. For such a driving apparatus 100, details are described by using FIG. 8. FIG. 8 shows a fifth configuration example of the driving apparatus 100 according to the present embodiment. The driving apparatus 100 of the fifth configuration example further includes a focus detection section 310 and an adjustment section 320.

The focus detection section 310 detects the focus state of the lens section 10. The focus detection section 310 detects the focus position of the lens 20 after the control section 130 drives the actuator 110 and moves the lens section 10. The focus detection section 310 may detect the focus position based on an image obtained by the lens 20 by a phase difference detection method, a contrast detection method and the like. The focus detection section 310 may detect, as the focus state, a focus error between the focus position of the lens 20 moved to the specified position, and the object.

The adjustment section 320 adjusts the driving amount of the actuator 110 based on the focus state of the lens section 10. The adjustment section 320 may adjust the driving amount of the actuator 110 so as to reduce the focus error detected by the focus detection section 310. The adjustment section 320 may also supply an instruction of adjusting the driving amount of the actuator 110 to the control section 130, or instead of this, may also supply the instruction to the correction section 160.

Accordingly, the driving apparatus 100 according to the present embodiment can perform the autofocus function according to an image processing of high accuracy after performing the high-speed autofocus function using the infrared light and the like to achieve the focus adjustment at high speed and with high accuracy. Note that the driving apparatus 100 may also further include a storage section that stores the adjustment amount according to the adjustment section 320. Accordingly, if the control section 130 moves the lens section 10 next according to the control signal, the correction section 160 can further correct the position of the lens section 10 according to the adjustment amount stored by the storage section.

The example in which the driving apparatus 100 according to the present embodiment described above includes the temperature detection section 154 and the correction section 160 corrects the magnetic field information and/or the control signal based on the temperature information detected by the temperature detection section 154 has been described. Instead of this, the driving apparatus 100 may also not include the temperature detection section 154. That is, the driving apparatus 100 may also include a temperature information input section that inputs the temperature information showing the ambient temperature of the lens section. In this case, the driving apparatus 100 receives the temperature information input from the outside and the correction section 160 corrects the magnetic field information and/or the control signal based on the temperature information. Also, for the driving apparatus 100, the correction section 160 may also be on the outside. The driving apparatus 100 may also output the temperature information to the correction section 160 on the outside (or, the correction section 160 on the outside receives the temperature information on the outside), receive the correction value calculated by the outside and add the correction value to the magnetic field information and/or the control signal.

The example in which the driving apparatus 100 according to the present embodiment described above includes the magnetic field detection section 120 that detects the magnetic field generated by the magnetic field generation section 30 fixed to the lens section 10 had been described; however, it is not limited to this. For example, the magnetic field detection section 120 may also be provided to the lens section 10 and the magnetic field generation section 30 may also be provided separately and independently from the lens section 10. In this case, at least parts of the actuator 110 may be provided to the lens section 10. That is, even if a coil of the actuator 110 is fixed to the lens section 10 to generate a magnetic force so as to attract or separate the magnetic field generation section 30, the actuator 110 can move the lens section 10.

Also, the example in which the magnetic field generation section 30 and the actuator 110 are provided separately and independently has been described; however, it is not limited to this. For example, the magnetic field detection section 120 may detect the magnetic field generated by the actuator 110, and in this case, the magnetic field generation section 30 is included in the actuator 110.

Note that if the magnetic field generation section 30 is included in the actuator 110, the actuator 110 may cause the magnetic force to be generated so as to attract or separate the lens holder 22 and the like, and in this case, it is desirable that the magnetic field detection section 120 is fixed to the lens section 10. Also, if the actuator 110 including the magnetic field generation section 30 is fixed to the lens section 10, the actuator 110 may cause the magnetic force to be generated so as to attract or separate metals and the like provided separately and independently from the lens section 10.

In the present embodiment described above, the example of the driving apparatus 100 that moves the lens section 10 has been described; however, the driving apparatus 100 is not limited to the present example. The driving apparatus 100 may also move the imaging device, an image sensor section or the like that detects an image obtained by collecting lights by the lens 20. That is, the actuator 110 may move the image sensor section and the magnetic field detection section 120 may detect the magnetic field of the magnetic field generation section 30 fixed to the image sensor section. In this way, the actuator 110 may change the relative position between the lens section 10 and the imaging device that detects the image obtained by collecting lights by the lens 20. Also, the magnetic field detection section 120 may detect the magnetic field information corresponding to the relative position between the lens section 10 and the imaging device.

In the present embodiment described above, the driving apparatus 100 that moves the lens section 10 has been described. Note that the driving apparatus 100 may also be a part of a lens unit. That is, the lens unit includes the lens section 10 and the driving apparatus 100. Also, the lens unit may also be combined with the signal supply section 200 to configure a lens system. Also, other than the lens position, because a configuration in which a light reception section side of the image sensor section that receives lights obtained by collecting lights by the lens, and the like is moved is also a configuration in which that the lens section 10 is relatively moved, it goes without saying that the configuration is equivalent to the present embodiment described above. Also, the above-described form may also be used in a case where a plurality of cameras, such as dual cameras, are used.

In the present embodiment described above, the example in which the driving apparatus 100 includes a device in which at least parts are integrated has been described. In addition to this, the driving apparatus 100 may also include a device in which the driving amount of the actuator 110 is input and which outputs the corrected driving amount obtained by correcting the driving amount of the actuator 110. That is, the device is a device in which the correction section 160 and the control section 130 are integrated. For such a device, details are described by using FIG. 9.

Figure 9:
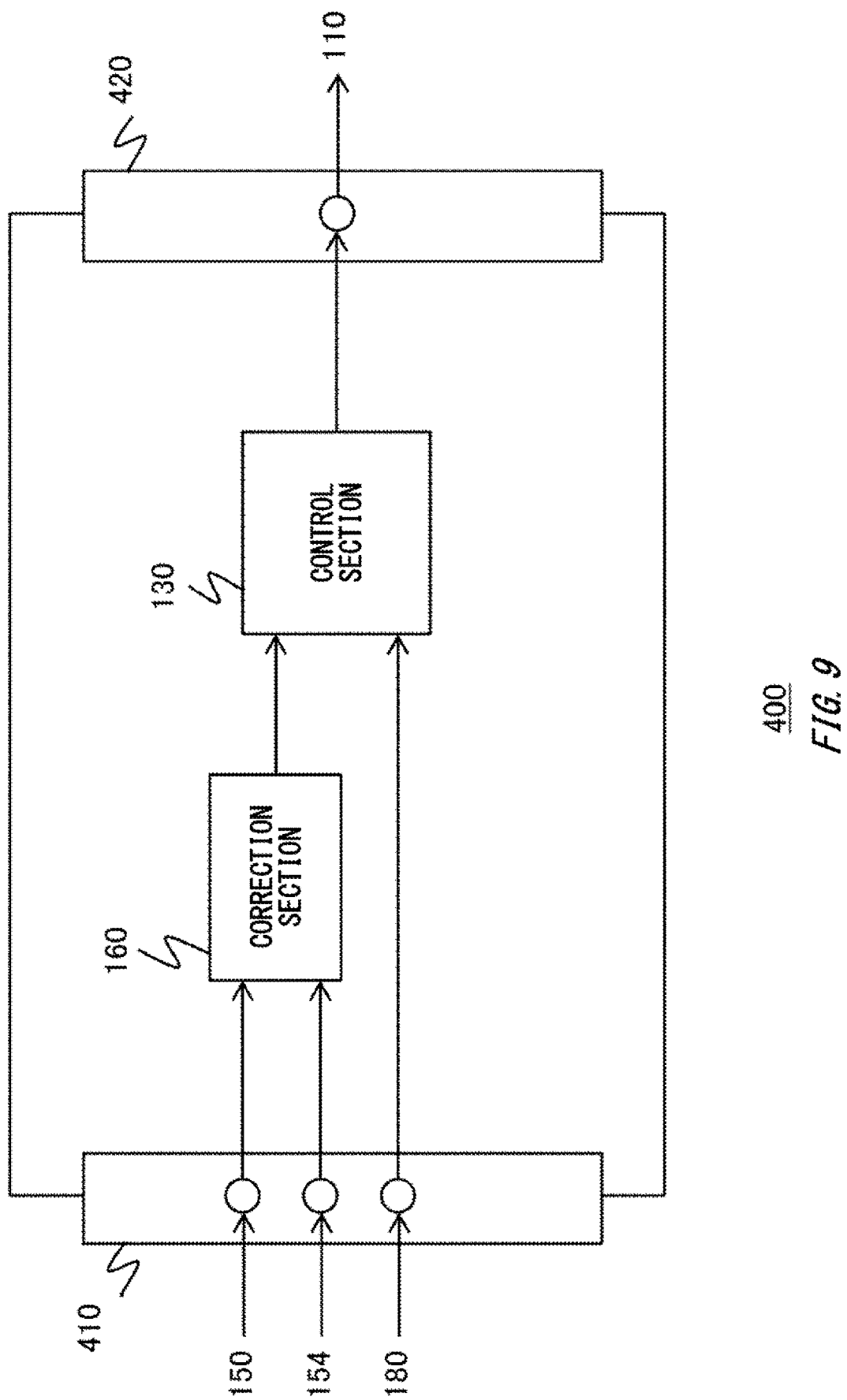
FIG. 9 shows a configuration example of a device 400 in which parts of the driving apparatus 100 according to the present embodiment are integrated.

FIG. 9 shows a configuration example of a device 400 in which parts of the driving apparatus 100 according to the present embodiment are integrated. The device 400 includes the control section 130, the correction section 160, an input section 410, and an output section 420.

The input section 410 inputs the temperature information and the driving amount of the actuator 110. Also, the input section 410 may further input the magnetic field information corresponding to the position of the lens section 10. For example, the input section 410 is connected to the temperature detection section 154 and receives the temperature information from the temperature detection section 154. For example, the input section 410 is connected to the reception section 180 and inputs the control signal received from the reception section 180 as the driving amount of the actuator 110. Also, the input section 410 may also be connected to the AD conversion section 150 and receive the magnetic field information from the AD conversion section 150.

As previously described, the correction section 160 calculates the correction value that corrects the driving amount of the actuator 110 to drive the lens section 10 or the imaging device according to the temperature information showing the ambient temperature of the lens section 10. For example, the correction section 160 calculates the correction value to correct the driving amount of the actuator 110 based on the temperature information, and outputs the correction value to the control section 130. Also, the correction section 160 may also correct the magnetic field information based on the temperature information and output the corrected magnetic field information to the control section 130 as the correction value.

As previously described, the control section 130 controls the driving amount of the actuator 110 based on the driving amount of the actuator 110 received from the input section 410 and the correction value received from the correction section 160. For example, the control section 130 calculates the corrected driving amount obtained by correcting the driving amount of the actuator 110 based on the driving amount of the actuator 110 and the correction value.

Then, the output section 420 outputs the corrected driving amount corrected by the control section 130. The output section 420 may be connected to the actuator 110 and supply the corrected driving amount to the actuator 110. As described above, the device 400 can output, to the actuator 110, the corrected driving amount obtained by correcting the driving amount of the actuator based on the temperature information and the driving amount of the actuator. Such a device 400 can correspond to various actuators 110.

Figure 10:
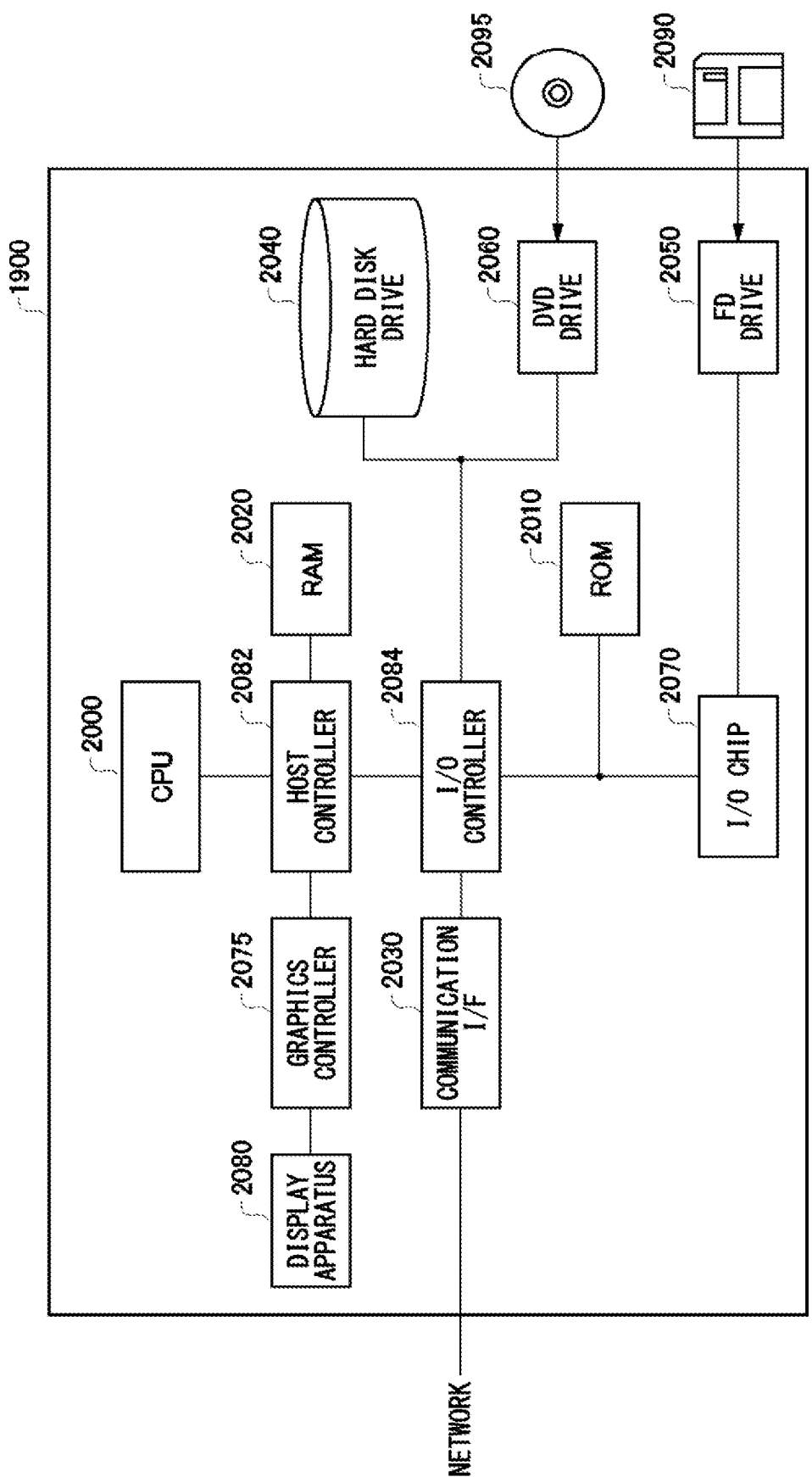
FIG. 10 shows one example of a hardware configuration of a computer 1900 that functions as the driving apparatus 100 according to the present embodiment.

FIG. 10 shows one example of a hardware configuration of a computer 1900 that functions as the driving apparatus 100 according to the present embodiment. The computer 1900 according to the present embodiment includes a CPU peripheral section that includes a CPU 2000, a RAM 2020, a graphics controller 2075, and a display apparatus 2080 which are connected mutually by a host controller 2082; an input/output section that includes a communication interface 2030, a hard disk drive 2040, and a DVD drive 2060 which are connected to the host controller 2082 by an input/output controller 2084; and a legacy input/output section that includes a ROM 2010, a flexible disk drive 2050, and an input/output chip 2070 which are connected to the input/output controller 2084.

The host controller 2082 connects the RAM 2020 to the CPU 2000, which accesses the RAM 2020 at a high transfer rate, and the graphics controller 2075. The CPU 2000 operates based on a program stored in the ROM 2010 and the RAM 2020 to perform controlling on each section. The graphics controller 2075 obtains image data that is generated, by the CPU 2000 and the like, on a frame buffer provided within the RAM 2020, and displays the image data on the display apparatus 2080. Instead of this, the graphics controller 2075 may also include the frame buffer that stores the image data generated by the CPU 2000 and the like therein.

The input/output controller 2084 connects the host controller 2082 to the communication interface 2030 being a relatively high-speed input/output apparatus, the hard disk drive 2040, and the DVD drive 2060. The communication interface 2030 communicates with other apparatuses via a network. The hard disk drive 2040 stores a program and data used by the CPU 2000 within the computer 1900. The DVD drive 2060 reads the program or data from the DVD-ROM 2095, and provides the read program or data to the hard disk drive 2040 via the RAM 2020.

Also, the input/output controller 2084 is connected to the ROM 2010, the flexible disk drive 2050, and a relatively low-speed input/output apparatus of the input/output chip 2070. The ROM 2010 stores a boot program that is executed by the computer 1900 during start-up and/or a program that depends on hardware of the computer 1900, and the like. The flexible disk drive 2050 reads the program or data from the flexible disk 2090 and provides the read program or data to the hard disk drive 2040 via the RAM 2020. The input/output chip 2070 connects the flexible disk drive 2050 to the input/output controller 2084, and connects various input/output apparatuses to the input/output controller 2084 at the same time via a parallel port, a serial port, a keyboard port, a mouse port and the like, for example.

The program provided to the hard disk drive 2040 via the RAM 2020 is stored in a recording medium such as the flexible disk 2090, the DVD-ROM 2095, or an IC card, and is provided by a user. The program is read from the recording medium, is installed in the hard disk drive 2040 within the computer 1900 via the RAM 2020, and is executed in the CPU 2000.

The program is installed in the computer 1900, and causes the computer 1900 to function as the control section 130, the correction section 160, the focus detection section 310, and the adjustment section 320.

Information processing described in the program functions, by being read in the computer 1900, as the control section 130, the correction section 160, the focus detection section 310, and the adjustment section 320 which are the specific means of cooperation of software and the above-described various hardware resources. Also, according to these specific means, the specific driving apparatus 100 corresponding to a usage purpose is configured by achieving the arithmetic operation or the information processing corresponding to the usage purpose of the computer 1900 in the present embodiment.

As one example, if a communication between the computer 1900 and the apparatus or the like on the outside is to be performed, the CPU 2000 executes the communication program loaded on the RAM 2020 and instructs the communication interface 2030 to perform a communication processing based on the processing contents described in the communication program. The communication interface 2030 receives a control of the CPU 2000, reads transmission data that is stored in a transmission buffer area and the like provided on a storage device such as the RAM 2020, the hard disk drive 2040, the flexible disk 2090 or the DVD-ROM 2095, and sends the transmission data to the network, or writes reception data received from the network in a reception buffer area and the like provided on the storage device. In this way, the communication interface 2030 may also transfer the transmission/reception data to/from the storage device by a DMA (Direct Memory Access) scheme. Instead of this, the communication interface 2030 may also transfer the transmission/reception data by reading, by the CPU 2000, the data from the storage device or the communication interface 2030 being the transfer source and writing the data to the communication interface 2030 or the storage device being the transfer destination.

Also, the CPU 2000 reads, to the RAM 2020 by the DMA transfer and the like, all or required parts of files, database or the like stored in an external storage device such as the hard disk drive 2040, the DVD drive 2060 (the DVD-ROM 2095) and the flexible disk drive 2050 (the flexible disk 2090) to perform various processes on the data on the RAM 2020. Then, the CPU 2000 writes back the data after the processing is completed to the external storage device by the DMA transfer and the like. As it is considered that in such a processing, the RAM 2020 temporarily holds the contents of the external storage device, in the present embodiment, the RAM 2020, the external storage device and the like are collectively referred to as a memory, a storage section, a storage device or the like. Various programs and various information, such as the data, tables, database and the like, in the present embodiment are stored on such a storage device and are objects of the information processing. Note that the CPU 2000 can also hold parts of the RAM 2020 in a cache memory to perform reading and writing on the cache memory. In such a configuration as well, because the cache memory serves as a part of the functions of the RAM 2020, in the present embodiment, the cache memory is also included in the RAM 2020, the memory, and/or the storage device, unless it is shown discriminately.

Also, the CPU 2000 performs, on the data read from the RAM 2020, various processes including various arithmetic operations, information processes, condition determination, information searches and/or replacements and the like, which are specified by an instruction sequence of the program and which are described in the present embodiment, and writes back the data to the RAM 2020. For example, if the condition determination is to be performed, the CPU 2000 determines whether various variables shown in the present embodiment satisfy conditions such as larger, smaller, equal to or larger than, equal to or smaller than, or equal to other variables or constants, and if the condition is satisfied (or if the condition is not satisfied), the CPU 2000 branches to a different instruction sequence or calls a subroutine.

Also, the CPU 2000 can search the information stored in the files, database or the like within the storage device. For example, if a plurality of entries each having an attribute value of a second attribute associated with an attribute value of a first attribute are stored in the storage device, the CPU 2000 can obtain, by searching, from the plurality of entries stored in the storage device, an entry in which the attribute value of the first attribute matches a specified condition and reading the attribute value of the second attribute stored in the entry, the attribute value of the second attribute associated with the first attribute that satisfies the predetermined condition.

The program or module shown above may also be stored in an external recording medium. As the recording medium, other than the flexible disk 2090 and the DVD-ROM 2095, an optical recording medium such as DVD, Blu-ray (registered trademark) or CD, a magneto-optical recording medium such as MO, a tape medium, a semiconductor memory such as an IC card, and the like can be used. Also, a hard disk or a storage device, such as a RAM, provided in a server system connected to a dedicated communication network or Internet may also be used as the recording medium and provide the program to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A driving apparatus, comprising:
    an actuator to change a relative position between a lens section and an imaging device;
    a temperature detection section to detect an ambient temperature of the lens section and to output temperature information;
    a correction section to correct a driving amount of the actuator according to the temperature information; and
    a control section to supply a drive current to the actuator, and control the driving amount of the actuator, wherein
    at least the temperature detection section and the control section are integrally formed as a device, and
    the correction section corrects the temperature information according to the drive current.

2. The driving apparatus according to claim 1, wherein
    the lens section moves in at least one direction of an optical axis direction and a direction different from the optical axis direction, and
    the actuator moves the lens section.

3. The driving apparatus according to claim 2, comprising:
    a control input section to input a control signal that specifies a target position of the lens section, wherein
    the control section controls the driving amount of the actuator based on the control signal.

4. The driving apparatus according to claim 3, wherein
    the correction section corrects a control signal input from the control input section based on the temperature information.

5. The driving apparatus according to claim 2, comprising:
    a magnetic field detection section to detect magnetic field information corresponding to a position of the lens section, wherein
    the correction section corrects the magnetic field information based on the temperature information, and
    the control section controls the driving amount of the actuator based on the corrected magnetic field information.

6. The driving apparatus according to claim 5, wherein
    the lens section includes a magnetic field generation section to generate a magnetic field, and
    the magnetic field detection section detects the magnetic field generated by the magnetic field generation section and outputs the magnetic field information.

7. The driving apparatus according to claim 5, wherein
    the magnetic field detection section outputs magnetic field information of a magnitude corresponding to a position of the lens section in one direction.

8. The driving apparatus according to claim 2, further comprising:
    a focus detection section to detect a focus state of the lens section; and
    an adjustment section to adjust the driving amount of the actuator based on the focus state of the lens section.

9. The driving apparatus according to claim 2, further comprising:
    a position detection section to detect a position of the lens section; wherein
    at least the temperature detection section, the control section and the position detection section are integrally formed as the device.

10. The driving apparatus according to claim 1, comprising:
    a temperature information input section to input temperature information showing the ambient temperature of the lens section.

11. The driving apparatus according to claim 1, comprising:
    at least the temperature detection section, the control section and the correction section are integrally formed as the device.

12. A lens unit, comprising:
    the lens section; and
    the driving apparatus according to claim 1.

13. A correction method of a driving apparatus that moves a position of a lens section that moves in at least one direction of an optical axis direction and a direction different from the optical axis direction, the correction method comprising:
    by a temperature detection of the driving apparatus, detecting an ambient temperature of the lens section and outputting temperature information;
    correcting a driving amount of the driving apparatus according to the temperature information; and
    by a control section of the driving apparatus, supplying a drive current to an actuator of the driving apparatus, and controlling a driving amount of the driving apparatus, wherein
    at least the temperature detection section and the control section are integrally formed as a device, and
    the correcting the driving amount includes correcting the temperature information according to the drive current.

14. The correction method according to claim 13, comprising:
inputting the temperature information that is a detection result of the ambient temperature of the lens section.

15. The correction method according to claim 13, comprising:
inputting a control signal that specifies a target position of the lens section, wherein
the controlling the driving amount includes controlling the driving amount of the driving apparatus based on the control signal.

16. The correction method according to claim 13, comprising:
detecting magnetic field information corresponding to a position of the lens section, wherein
the correcting the driving amount includes correcting the magnetic field information based on the temperature information, and
the controlling the driving amount includes controlling the driving amount of the driving apparatus based on the corrected magnetic field information.

17. The correction method according to claim 13, further comprising, after the controlling the driving amount of the driving apparatus:
detecting a focus state of the lens section; and
further correcting the driving amount of the driving apparatus based on the focus state of the lens section.

18. A computer readable recording medium that stores a program for making a computer perform the correction method according to claim 13.

19. A device, comprising:
a control input section to input a control signal that specifies a target position of a lens section;
a temperature detection section to detect an ambient temperature of the lens section and to output temperature information;
an input section to input the temperature information and a driving amount of an actuator;
a correction section to calculate, based on the temperature information, a correction value of a driving amount of the actuator to drive a lens section or an imaging device;
an output section to output a corrected driving amount obtained by correcting the driving amount of the actuator based on the driving amount of the actuator and the correction value; and
a control section that supplies a drive current of the actuator based on the corrected driving amount, and controls a driving amount of the actuator, wherein
the control section and the temperature detection section are integrally formed, and
the correction section corrects the temperature information according to the drive current.

20. The device according to claim 19, further comprising:
a position detection section to detect a position of the lens section.

* * * * *